United States Patent [19]

McLeod

[11] Patent Number: 4,787,675

[45] Date of Patent: Nov. 29, 1988

[54] ADJUSTABLE SEAT TO SUPPORT AN OCCUPANT AT A CONSTANT HEIGHT

[76] Inventor: Michael E. McLeod, 28645 South Pointe Dr., Grosse Ile, Mich. 48138

[21] Appl. No.: 931,955

[22] Filed: Nov. 24, 1986

Related U.S. Application Data

[63] Continuation of Ser. No. 831,662, Feb. 19, 1986, abandoned.

[51] Int. Cl.$^4$ ............................................... A47C 1/12
[52] U.S. Cl. ...................................... 297/335; 297/423
[58] Field of Search ............... 297/331, 333, 330, 334, 297/335, 336, 423

[56] References Cited

U.S. PATENT DOCUMENTS

| | | | |
|---|---|---|---|
| 6,795 | 10/1849 | Smith | 297/423 X |
| 1,164,127 | 12/1915 | Seltmann | 297/423 X |
| 1,428,018 | 9/1922 | Erickson | 297/334 |
| 2,043,287 | 6/1936 | Dorton | 297/336 |
| 2,383,178 | 1/1945 | Edwards | 9/7 |
| 3,065,020 | 11/1962 | Cox | 296/65 |
| 3,194,601 | 7/1965 | Hoven et al. | 297/333 |
| 3,428,976 | 2/1969 | Robinson | 9/7 |
| 3,886,611 | 6/1975 | Lammy et al. | 9/7 |
| 4,168,099 | 9/1979 | Jacobs et al. | 297/330 |
| 4,279,398 | 7/1981 | Pregnall | 248/405 |
| 4,425,863 | 1/1984 | Cutler | 114/363 |
| 4,516,805 | 5/1985 | Leeper et al. | 297/320 |
| 4,552,404 | 11/1985 | Congleton | 297/330 |

Primary Examiner—Francis K. Zugel
Attorney, Agent, or Firm—David C. Purdue

[57] ABSTRACT

A seat including a seat back and a seat bottom which is pivotally mounted is disclosed. The seat bottom is pivotally mounted for rotational movement between a first position wherein the seat bottom is substantially horizontal and a second position wherein the seat bottom is angled relative to a horizontal plane. The seat also includes means for maintaining the seat bottom in a number of positions intermediate the first and second positions. An occupant of the seat can select a seat bottom position which provides the best balance between the shock absorbing functions provided by the knees and the posterior.

12 Claims, 5 Drawing Sheets

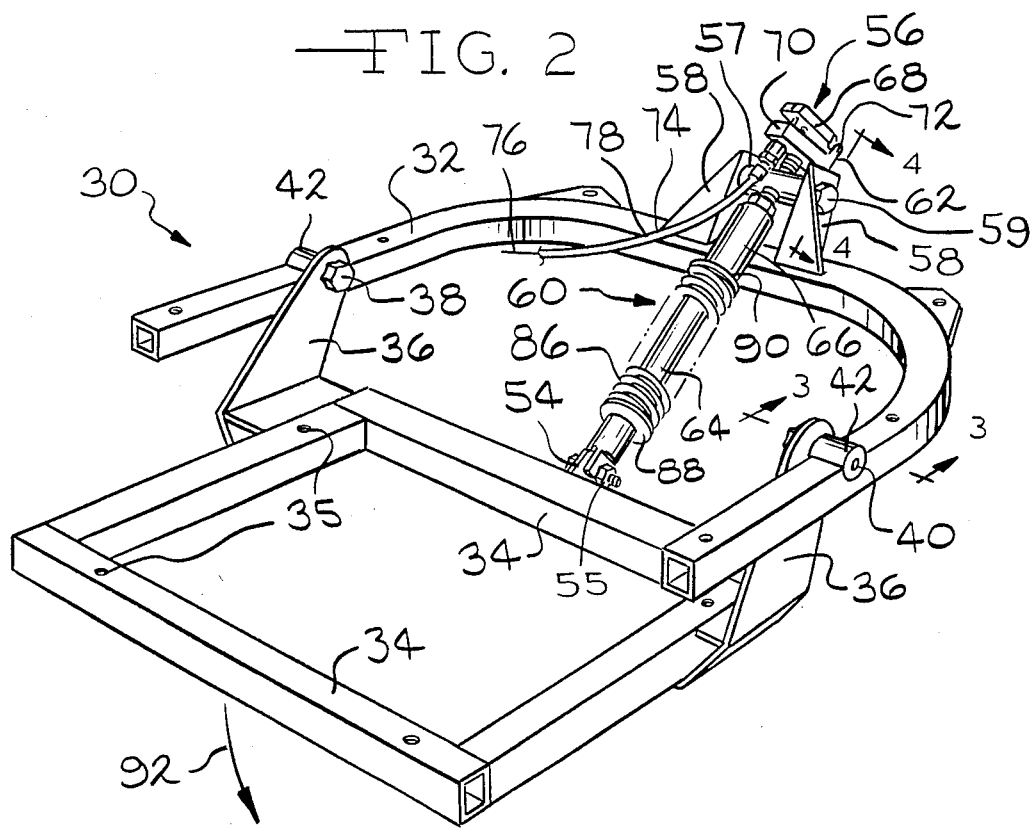
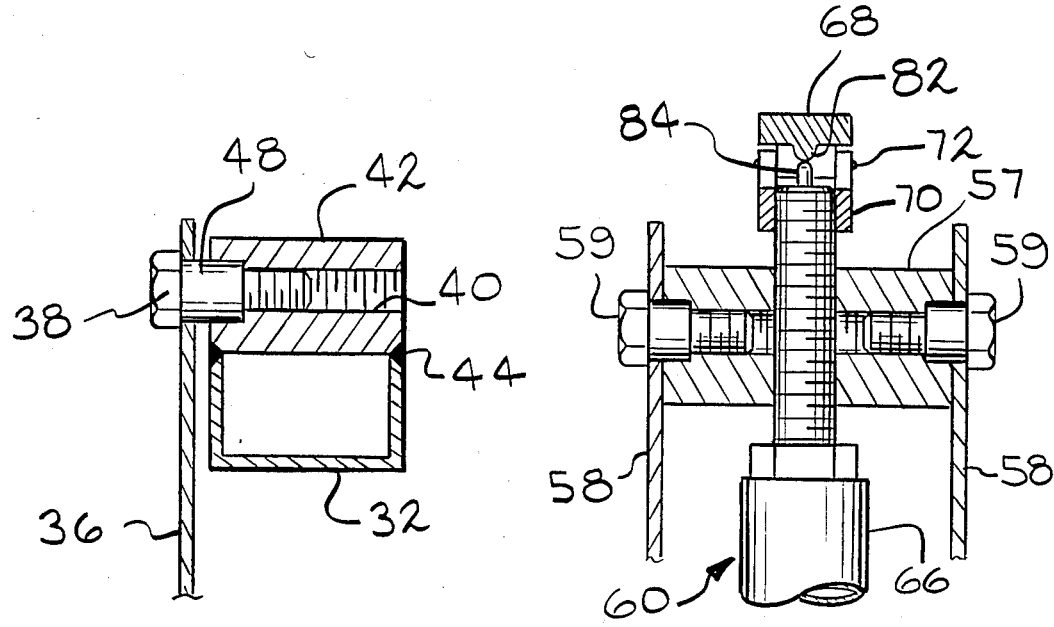

ADJUSTABLE SEAT TO SUPPORT AN OCCUPANT AT A CONSTANT HEIGHT

The application is a continuation of application Ser. No. 06/831,662, filed Feb. 19, 1986 now abandoned.

BACKGROUND OF THE INVENTION

1. Field of the Invention

The subject invention is concerned with seats and, more specifically, with seats which include a seat bottom which is adjustable relative to the seat back. Such a seat has particular utility in the field of boating, especially off-shore speed boating.

2. Description of the Prior Art the provision of improved seats, particularly seats for boats.

U.S. Pat. No. 3,428,976 discloses a convertible helmsman's seat for a power boat. The seat is provided with means to adjust the vertical position of the seat relative to a boat deck. In addition, the seat can be swiveled from a position where it faces the bow of a boat to a position where it faces the stern of a boat.

U.S. Pat. No. 4,279,398 discloses a helmsman's chair for a yacht. The chair is vertically adjustable and can be pivoted. The vertical adjustment is provided by means of an electrically powered screw jacking gear assembly.

U.S. Pat. No. 4,425,863 discloses a pendulum helmsman's seat. The seat is supported in a pendulum fashion in a manner whereby the axis of swinging of the seat structure may be adjusted vertically. In addition, the seat is adjustable to accommodate the size of the helmsman using the seat and further includes a vertically adjustable foot rest structure. According to the patent, the seat is adapted to "provide maximum comfort and stability to a helmsman of a ship experiencing roll movements".

Additionally, U.S. Pat. Nos. 2,383,178, 3,065,020 and 3,886,611 disclose various hinge means provided in connection with boat seat structures.

During the high speed operation of any boat, very large forces are transmitted to and through the contents of the boat, including the occupants. The magnitude of these forces is proportional to the speed of the boat as well as to the height of the waves or the chop on the water. Some off-shore racing boats can travel at speeds exceeding 100 mph. Such speeds, combined with even a mild chop, will produce tremendous forces, most of which would be transmitted through conventional boat seats, having seat bottoms in a substantially horizontal plane, to the occupants thereof. In an effort to reduce the impact of these forces on an occupant of a boat seat, the stand-up bolster was developed.

A stand-up bolster is a seat having a seat back and including a seat bottom which can be removed or pivoted to an out of the way position. The occupant of a stand-up bolster in which the seat bottom is out of the way assumes a standing or semi-standing position leaning against the seat back. Preferably, the knees of the occupant are slightly bent so that they can serve as shock absorbers for the forces developed during high speed travel over choppy water. However, in a standing position with knees slightly bent, all of these forces will act on one's legs. Alternatively, the seat bottom of a stand-up bolster can be placed in a substantially horizontal position. In this case, an occupant of the seat will be supported by his or her posterior. Traveling at high speeds over choppy water in this position is extremely uncomfortable because the resultant forces are transmitted to and act primarily upon the spine.

It has been determined that, during high speed boat travel, a body position between standing and sitting is desirable. In this position, one can use one's legs to absorb a portion of the forces associated with boat travel. The remaining forces can be transmitted through a boat seat to a natural shock absorber, the posterior.

At times, other than during high speed travel on choppy water, a seat bottom of a boat seat should have a substantially horizontal orientation, for example, during travel on calm waters. There are also times when it is desirable to have the seat bottom in an out of the way position, for example, while docking maneuvers are being performed.

SUMMARY OF THE INVENTION

The instant invention is based upon the discovery of an improved seat structure which is particularly well suited for use in a boat, especially a speedboat. The seat includes a seat back and a seat bottom which is pivotally mounted for movement between a first position wherein the seat bottom is substantially horizontal and a second position wherein the seat bottom is angled relative to a horizontal plane. In the second position, the seat bottom is located where it will not interfere with a person standing between the seat and, for example, a steering wheel. The seat also includes means for maintaining the seat bottom in a number of positions intermediate the first and second positions. An occupant of a seat according to the instant invention can select a seat bottom position which provides the best balance between the shock absorbing functions provided by the knees and the posterior, as well as the conventional positions, i.e., substantially horizontal and out of the way.

A seat according to the instant invention can be provided with a seat bottom actuator which allows for infinite adjustment of the seat bottom between the first and second positions. The seat can also be provided with means to bias the seat bottom towards the first position. The seat can even be provided with variable biasing means whereby the degree of bias decreases as the seat bottom moves from the first position towards the second position.

A boat seat according to the instant invention can be provided with means for pivoting the seat bottom, relative to the seat back, at a point which is at or very near the center of gravity of an occupant of the seat. In this case, there is obtained a very important advantage, especially in the context of a helmsman's chair. As a helmsman adjusts the position of the seat bottom of such a helmsman's chair, from a first, substantially horizontal position towards a second, out of the way position, the helmsman can maintain a constant line of vision which does not change as the seat bottom moves. Consequently, a helmsman whose job it is to read the water can adjust the position of the seat bottom of the helmsman's chair without impairing or disrupting his reading of the water. It will be readily appreciated that this feature provides a substantial safety factor, the importance of which cannot be underestimated.

It is an object of the instant invention to provide an improved seat.

It is also an object of the instant invention to provide a seat which offers increased versatility by comparison with prior art seats.

It is a further object of the instant invention to provide a seat which offers maximum comfort to an occupant.

It is an additional object of the instant invention to provide a boat seat including a seat bottom, the position of which can be adjusted without impairing or disrupting an occupant as he reads the water.

Additional objects and advantages associated with the instant invention will be apparent to one skilled in the art upon reading the following disclosure, reference being made therein to the appended drawings wherein like reference numerals in a plurality of figures are used to designate like parts.

BRIEF DESCRIPTION OF THE DRAWINGS

FIG. 2 is a perspective view of one embodiment of a frame for a boat seat in accordance with the instant invention.

FIG. 3 is a sectional view taken along the line 3—3 of FIG. 2.

FIG. 4 is a sectional view taken along the line 4—4 of FIG. 2.

DETAILED DESCRIPTION OF THE INVENTION

Figure 1:
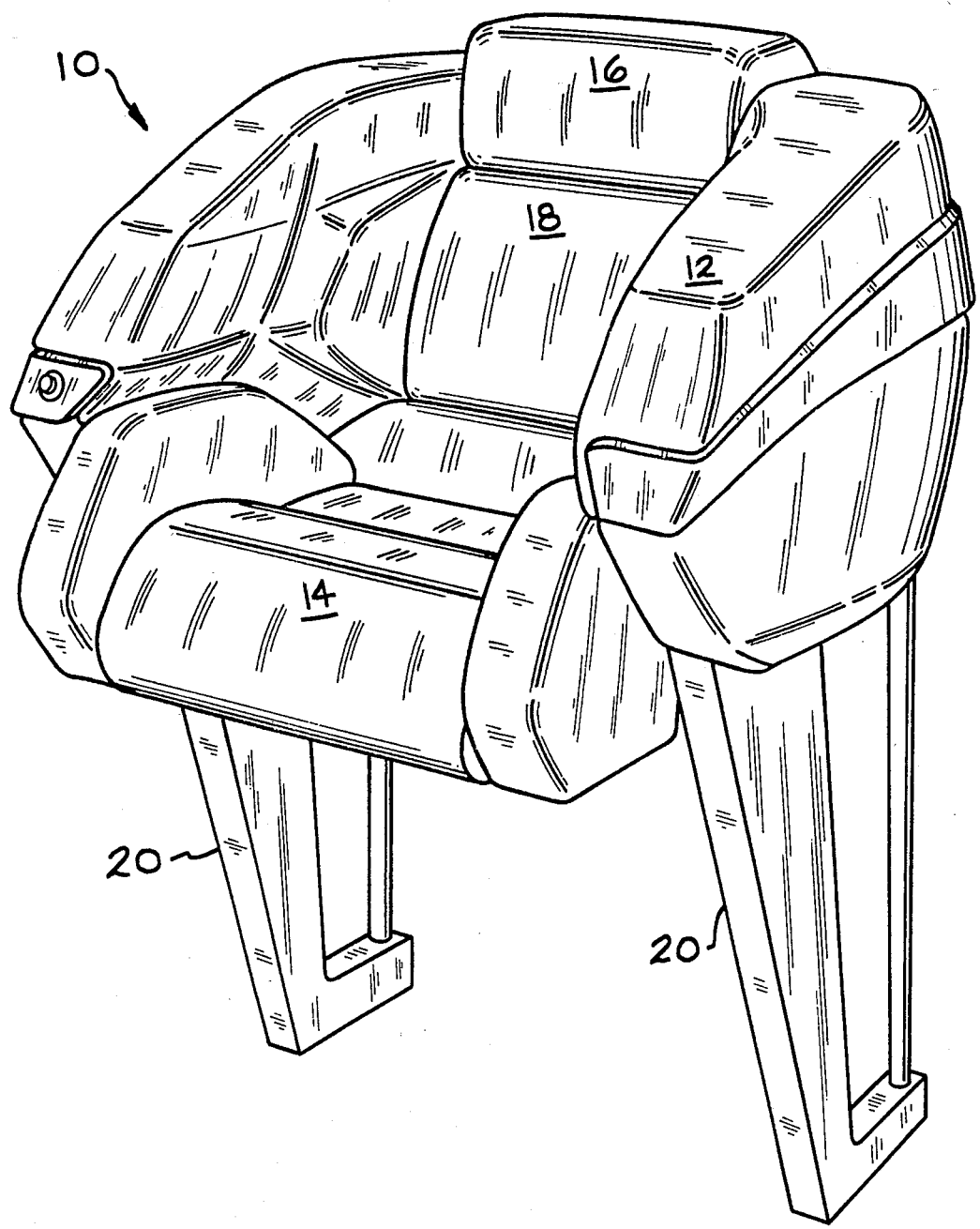
FIG. 1 is a perspective view of a bolster boat seat incorporating the instant invention.

A seat embodying the instant invention is indicated generally at 10 in FIG. 1. The specific seat 10 illustrated in FIG. 1 is a bolster boat seat, an application in which the instant invention is particularly useful.

The seat 10 comprises armrests 12, a seat bottom 14 and a seat back consisting of an upper cushion 16 and a lower cushion 18. The bolster 10 is supported by a pair of legs 20. The seat bottom 14 is illustrated, in FIG. 1, in a first position in which the seat bottom 14 is substantially horizontal. According to the instant invention, means are provided for pivoting the seat bottom 14 from the position illustrated in FIG. 1 to a position in which the seat bottom 14 is disposed at a substantial angle to a horizontal plane. The means are discussed in detail below.

Inside the bolster 10, there can be provided a frame assembly of the type indicated generally at 30 in FIG. 2. The frame assembly 30 comprises a seat back frame 32 and a seat bottom frame 34. On opposite sides of the seat bottom frame 34, there are provided a pair of flanges 36. Fasteners 38 extend through an aperture (not shown) provided in each flange 36. The fasteners 38 are engaged in apertures 40 which are provided in a reinforced portion 42 of the seat back frame 32. As shown in more detail in FIG. 3, the reinforced portion 42 is securely fastened to the seat back frame, for example, by welds indicated at 44.

The fastener 38 comprises an enlarged shaft portion 48 about which the flange 36 is mounted for rotation. In this manner, the seat bottom frame 34 is mounted for rotation, relative to the seat back frame 32, about the enlarged shaft portion 48 of the fastener 38.

Secured to the seat bottom frame 34, for example, by welding, is a mounting flange 54. One end of a linear actuator 56 is pivotally secured to the mounting flange 54 by a fastener 55. The other end of the linear actuator 56 is secured in a sleeve 57 which is pivotally mounted between a pair of flanges 58 by fasteners 59 in a manner similar to fasteners 38 (FIG. 2). The linear actuator 56 illustrated in FIG. 2 comprises a piston assembly 60 and a piston switch 62. The piston assembly 60 comprises a plunger 64 and a cylinder 66. The piston switch 62 comprises a lever 68 and a stationary flange 70. The lever 68 and the stationary flange 70 are hingedly connected at 72, as shown in some detail in FIG. 4. The piston switch 62 includes biasing means (not shown) which bias the lever 68 away from the stationary flange 70. The biasing means can be overcome by cable means 74 which comprise a cable 76 slidingly mounted in a sheath 78. One end of the cable 76 is fixed relative to the lever 68. The other end of the cable 76 is fixed relative to an activator 80 (FIG. 5) which is operable to effect relative sliding motion between the cable 76 and the sheath 78.

As mentioned above, the piston switch 62 includes biasing means (not shown), for example, a spring, which is operable to bias the lever 68 to a first position, away from the stationary flange 70. The activator 80 (FIG. 5), acting through the cable 76 (FIG. 2) is operable to overcome the biasing means of the piston switch 62, thereby moving the lever 68 to a second position, adjacent the stationary flange 70 as illustrated in FIGS. 2 and 4. With reference to FIG. 4, when the lever 68 is in the second position, a projection 82 thereon engages a pin 84 of the piston assembly 60. In this mode, the plunger 64 (FIG. 2) can slide within the cylinder 66, thereby permitting the seat bottom frame 34 to pivot, relative to the seat back frame 32. When there is no tension in the cable 76, the biasing means (not shown) of the piston switch 62 will cause the lever 68 to pivot about the hinge 0 72 thereby causing the projection 82 to disengage the pin 84 of the piston. In this mode, the plunger 64 is prevented from sliding in the cylinder 66. In turn, the seat bottom frame 34 is prevented from pivoting relative to the seat back frame 32.

The linear actuator 56 including the piston assembly 60 and the piston switch 62 is available from the P. L. Porter Co. under the registered trademark "HYDROLOK". It will be readily appreciated that other types of linear actuators may be substituted for the linear actuator 56. By way of example, without limitation, suitable linear actuators may include a screw jack mechanism with or without motor driving means, a pneumatic linear actuator, with or without power pump means as well as a virtually unlimited number of gearing combinations.

The linear actuator 56 (FIG. 2) also includes biasing means comprising a spring 86 positioned with its ends abutting a pair of flanges 88 and 90. The spring 86 is in compression between the flanges 88 and 90 which are rigidly secured to the plunger 64 and the cylinder 66, respectively. Accordingly, the spring acts to urge the plunger 64 and cylinder 66 to move in opposite directions. When the piston switch 62 is in its second position wherein the plunger 64 and the cylinder 66 can slide relative to one another, the force of the spring 86 ultimately urges the seat bottom frame 34 towards the first position which is illustrated in FIG. 2. When a given pressure is exerted on the seat bottom frame 34, the force exerted by the spring 86 will be overcome and the seat bottom frame 34 can pivot in the direction indicated by the arrow 92 in FIG. 2. The given pressure is determined, in part, by the spring constant of the spring 86. As discussed subsequently, the given pressure is also a function of the angular orientation of the seat bottom frame 34. The operation of a seat incorporating the frame assembly 30 shown in FIG. 2 will now be discussed in connection with FIGS. 5 through 7.

Figure 5:
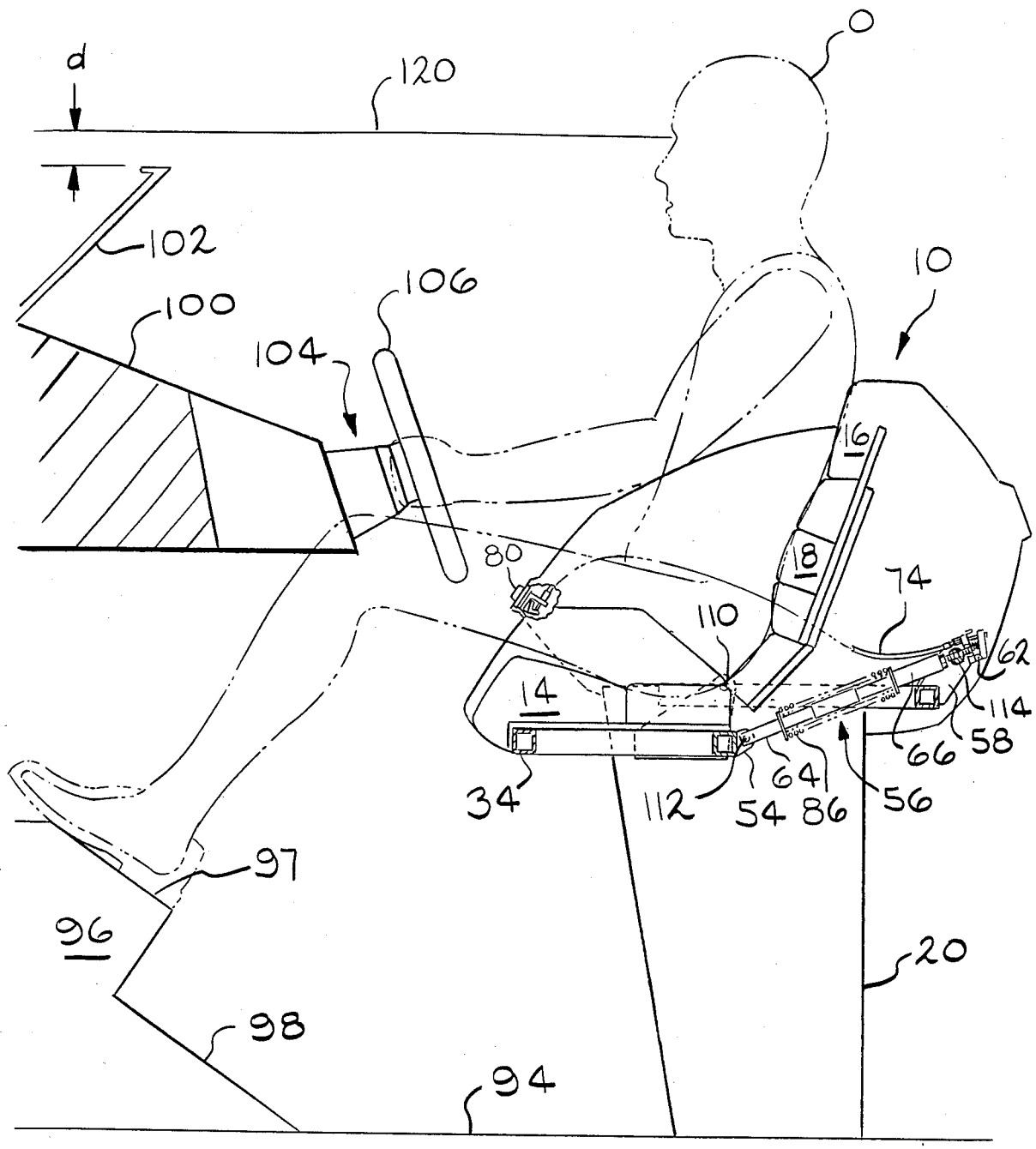
FIG. 5 is a partial sectional view of a seat including a seat bottom in a first, substantially horizontal position.
Figure 6:
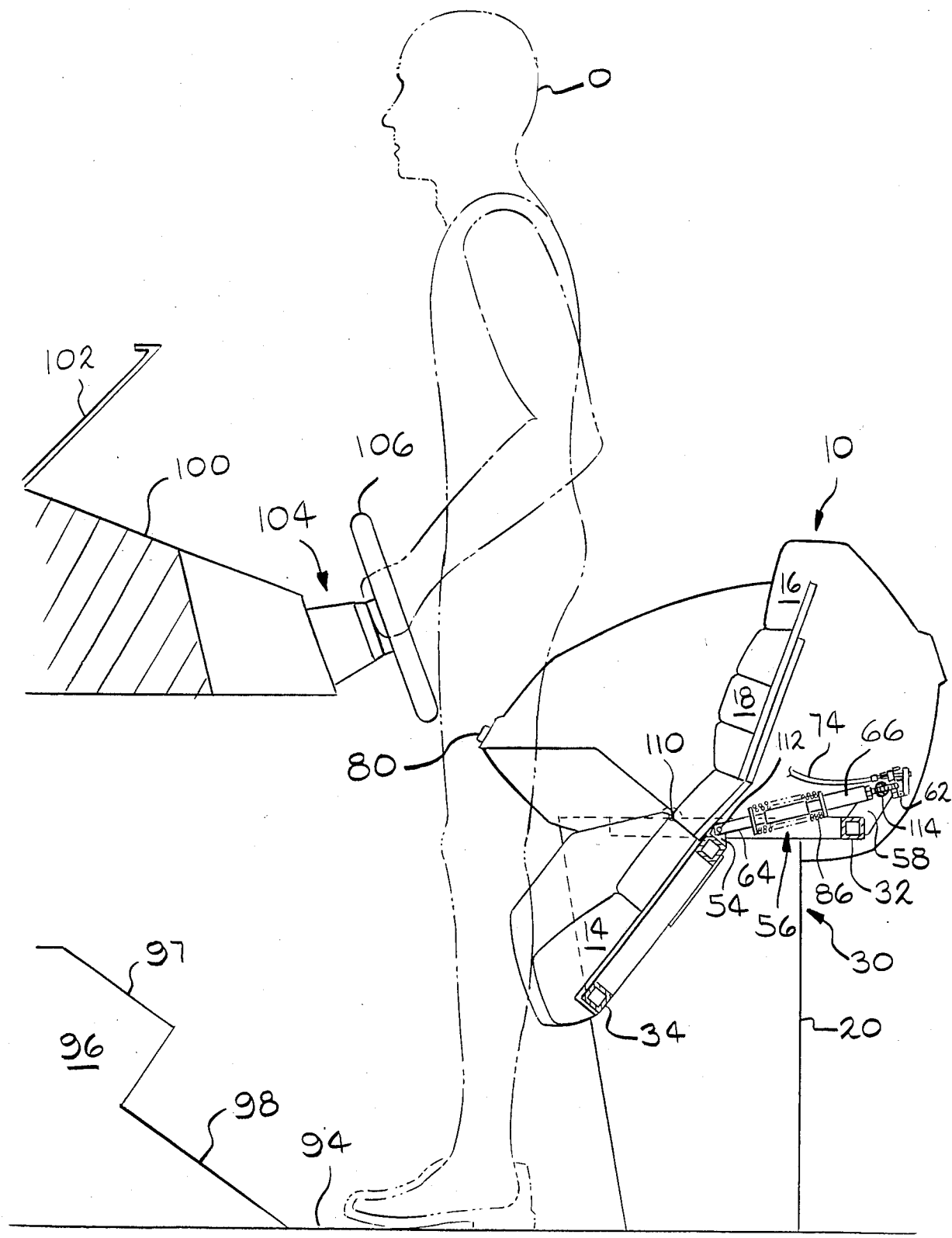
FIG. 6 is a partial sectional view, similar to FIG. 5 but wherein the seat bottom is in a second position, at a substantial angle to a horizontal plane.
Figure 7:
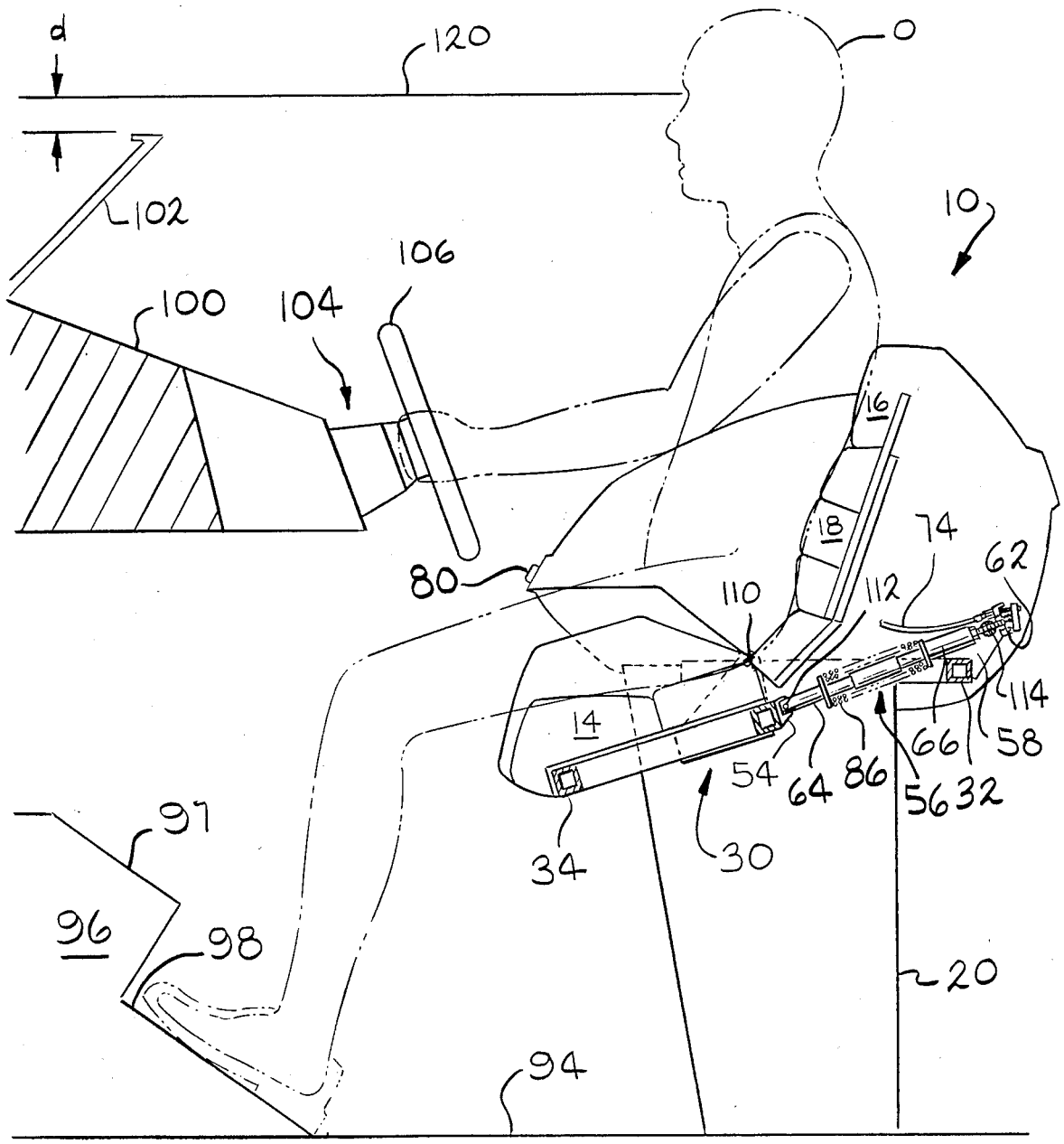
FIG. 7 is a partial sectional view, similar to FIGS. 5 and 6 but wherein the seat bottom is in a position intermediate the first and second positions.

The seat 10 is shown in FIGS. 5 through 7 as mounted on legs 20 which, in turn, are suitably mounted on a deck 94. Also mounted on the deck is a foot rest 96 including an upper surface 97 and a lower surface 98.

A portion of a dashboard 100 is shown in cross section in FIGS. 5 through 7. Secured to the dashboard 100 is a windshield assembly 102. Extending from the dashboard assembly 100 is a steering column assembly 104. A steering wheel 106 is secured to the steering column assembly 104.

Positioned in the seat 10 is a silhouette designated by 0. The silhouette is a scaled rendition of a six foot tall imaginary person affectionately known as "Oscar". Many years of ergonomic research have been devoted to the creation of Oscar for use in connection with the design of, inter alia, seating apparatus.

In FIG. 5, the seat bottom 14 is attached to the seat bottom frame which is mounted for rotation about a pivot point 110. The seat bottom is illustrated in a first, substantially horizontal position. The linear actuator 56 is extended to its fullest length between a pivot point 112 and a pivot point 114. With the seat bottom 14 in the position illustrated in FIG. 5, Oscar has a horizontal line of vision 120 which clears the top of the windshield 102 by a distance d. A brief study of FIG. 5 reveals that Oscar's center of gravity is positioned substantially directly over the pivot point 110. This configuration helps to minimize the stresses created in the frame assembly 30 when the seat 10 is occupied. The position of the pivot point 110 is important for an additional reason which is discussed below in connection with FIG. 7.

As shown in FIG. 5, Oscar's feet are conveniently and comfortably resting upon the upper surface 97 of the footrest 96. If Oscar was preparing to dock, he would find it desirable to rise to a standing position in order to improve his view of his surroundings. However, with the seat bottom 14 in the position illustrated in FIG. 5, there is not enough room for Oscar to stand between the steering wheel 106 and the seat bottom 14. In order to remedy this predicament, Oscar could depress the activator 80 thereby releasing the seat bottom 14 to pivot about the pivot point 110. The spring 86 will act to resist rotation of the seat bottom 14 about the pivot point 110. When the seat bottom 14 is in the position illustrated in FIG. 5, this resistance will be substantial. As the seat bottom 14 is pivoted towards the position illustrated in FIG. 6, however, this resistance will decrease. When the seat bottom 14 is rotated one unit of angular rotation from the position shown in FIG. 5, the spring 86 will be compressed a given distance, X. However, when the seat bottom is rotated the same unit of angular rotation, past the position illustrated in FIG. 6, the spring 86 will be compressed a given distance which will be substantially less than X. Indeed, when the seat bottom 14 is rotated to a position (not illustrated) where the pivot point 112 lies in a plane defined by the pivot points 110 and the pivot point 114, the spring will not exert any force. This arrangement facilitates rotation of the seat bottom 14 from the position illustrated in FIG. 5 to the position illustrated in FIG. 6. It will be appreciated that Oscar can easily exert a substantial rotational force to the seat bottom 14 when it is in the position illustrated in FIG. 5. Oscar's leverage will decrease, however, as the seat bottom 14 approaches the position illustrated in FIG. 6. However, the force required to rotate the seat bottom 14 also decreases as the seat bottom approaches the FIG. 6 position.

With reference to FIG. 7, the seat bottom 14 is illustrated in a position intermediate the positions shown in FIGS. 5 and 6. When the seat bottom 14 is in the FIG. 7 position, Oscar's feet may comfortably and conveniently rest on the lower surface 98 of the footrest 96. In this position, Oscar can use his legs to support a portion of his body weight. The remainder of his body weight will be supported by his posterior on the seat bottom 14. Although the seat is illustrated in FIG. 7 in a position which represents a substantial rotation from the position illustrated in FIG. 5, Oscar's horizontal line of vision 120 still clears the top of the windshield 102 by the distance d (FIGS. 5 and 7). Indeed, the seat bottom 14 can be rotated a substantial distance from the FIG. 7 position towards the FIG. 6 position and Oscar's horizontal line of vision will still clear the top of the windshield 102 by the distance d.

Thus it will be seen that the instant invention represents a substantial advance in the field of seating apparatus. The foregoing disclosure constitutes the best mode presently known to the inventor for practicing the instant invention but is not intended to limit the scope thereof. Indeed, the scope of the instant invention is limited only by the appended claims:

I claim:

1. A seat supported by means such as legs above a floor, a deck or the like, said seat comprising
   a seat back frame,
   a seat back secured to and supported by said seat back frame,
   a seat bottom frame having a forward portion,
   a seat bottom having an upper rear edge, said seat bottom being secured to and supported by said seat bottom frame,
   pivot means pivotally connecting said seat bottom frame to said seat back frame for rotation about the upper rear edge of said seat bottom between a first position wherein said seat bottom frame is substantially parallel to and at a given distance from the floor, deck or the like and a second position wherein said forward portion of said seat bottom frame is positioned substantially less than the given distance from the floor, deck or the like, said deck or the like, said pivot means being positioned forward of said seat back frame to the extent that, as the seat bottom frame is rotated from said first position to said second position and back to said first position, the torso of an occupant of said seat whose back is positioned against said seat back and whose buttocks is positioned on said seat bottom, is supported at a constant height relative to said seat back frame, and
   adjustment means operable to selectively retain said seat bottom frame is said first position and said second position, and
   footrest means having an upper surface for supporting the feet of an occupant of the seat when said seat bottom is in the first position and a lower surface for supporting the feet of an occupant of the seat when the seat bottom is in the second position.

2. The seat as claimed in claim 1 wherein said adjustment means are further operable to selectively retain said seat bottom frame in a plurality of positions intermediate said first and second positions.

3. The seat as claimed in claim 2 wherein said adjustment means comprise a piston and cylinder assembly having a first end secured to said seat bottom frame and a second end secured to said seat back frame.

4. The seat as claimed in claim 3 which additionally includes biasing means for applying a force to said seat bottom frame tending to rotate it towards said first position.

5. The seat as claimed in claim 4 wherein said biasing means are operable to apply a variable force to said seat bottom frame tending to rotate it towards said first position and wherein the force increases as the seat bottom frame approaches the first position.

6. The seat claimed in claim 1 wherein said pivot means pivotally connect said seat bottom frame to said seat back frame for rotation about the upper rear edge of said seat bottom between said first position and a third, out of the way position and wherein said second position is intermediate said first and third positions.

7. A seat supported by means such as legs above a floor, a deck or the like, said seat comprising
   a seat back frame,
   a seat back secured to and supported by said seat back frame,
   a seat bottom frame having a forward portion,
   a seat bottom having an upper rear edge, said seat bottom being secured to and supported by said seat bottom frame,
   pivot means pivotally connecting said seat bottom frame to said seat back frame for rotation between a first position wherein said seat bottom frame is substantially parallel to and at a given distance from the floor, deck or the like and a second position wherein said forward portion of said seat bottom frame is positioned substantially less than the given distance from the floor, deck or the like, said seat bottom frame being supported by said pivot means, for rotation relative to said seat back frame about a line which coincides with the upper rear edge of said seat bottom and is positioned forward of the seat back to the extent that, as the seat bottom frame is rotated from said first position to said second position and back to said first position, the torso of an occupant of said seat whose back is positioned against said seat back and whose buttocks is positioned on said seat bottom, is supported at a constant height relative to said floor, deck or the like, and
   adjustment means operable to selectively retain said seat bottom frame in said first position and said second position.

8. The seat claimed in claim 7 wherein said pivot means pivotally connect said seat bottom frame to said seat back frame for rotation about the upper rear edge of said seat bottom between said first position and a third, out of the way position and wherein said second position is intermediate said first and third positions.

9. The seat as claimed in claim 7 wherein said adjustment means are further operable to selectively retain said seat bottom frame in a plurality of positions intermediate said first and second positions.

10. The seat as claimed in claim 9 wherein said adjustment means comprise a piston and cylinder assembly having a first end secured to said seat bottom frame and a second end secured to said seat back frame.

11. The seat as claimed in claim 10 which additionally includes biasing means for applying a force to said seat bottom frame tending to rotate it towards said first position.

12. The seat as claimed in claim 11 wherein said biasing means are operable to apply a variable force to said seat bottom frame tending to rotate it towards said first position and wherein the force increases as the seat bottom frame approaches the first position.

* * * * *